No Printed Specification Available
9872X
C. G. Gilbert,
Horse Power.
Patented July 2, 1836.
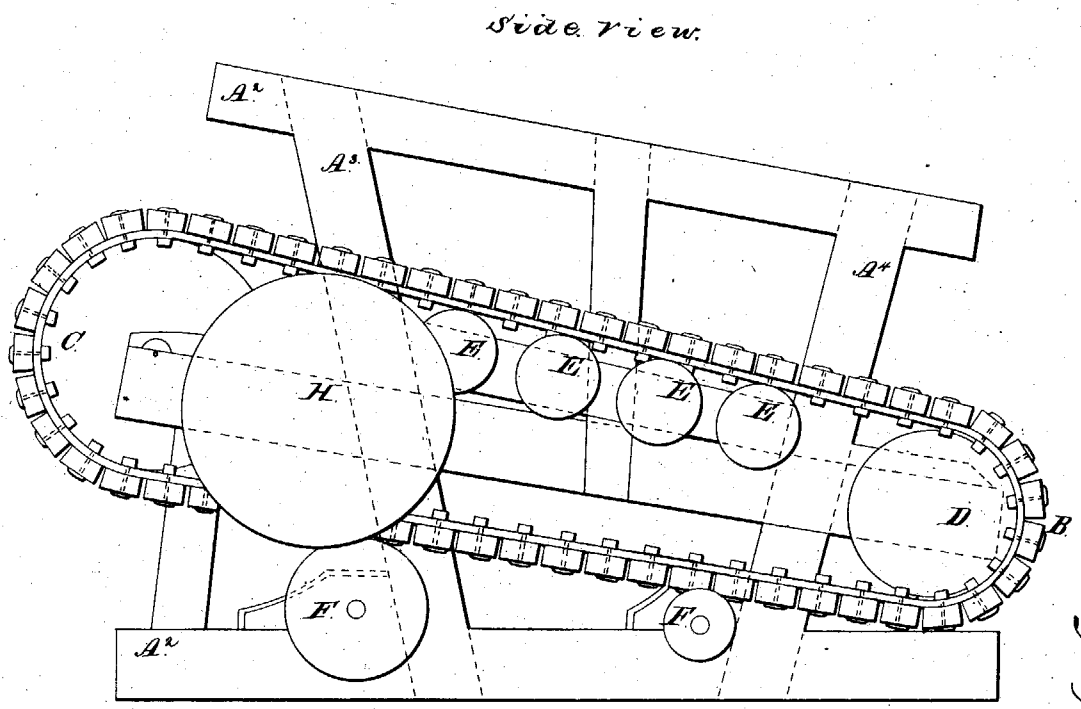
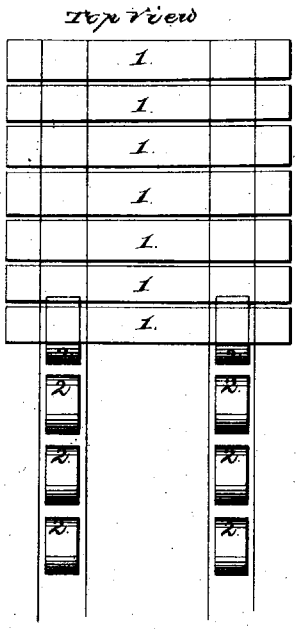
AM. PHOTO-LITHO. CO. N.Y. (OSBORNE'S PROCESS)

9872X

July 2, 1836

Charles G. Gilbert of Leeds Maine

Letters Patent

The Schedule referred to in these Letters Patent and making part of the
Same containing a description in the words of the said Charles G.
Gilbert himself of his improvement in the Horse Power.

To all to whom these presents shall come. Be it known that I
Charles G. Gilbert of Leeds, in the County of Kennebeck, in the State
of Maine, have invented a new and useful improved Horse
Power. In my Machine is combined all the advantages of Horse
Powers generally and at a much less expense rendering it accep
=table to most of Farmers. I do hereby declare that the following
is a full and exact description thereof. The general construction
and mode in which the Horse travels is similar to that of
Pitts, the Horse travelling upon an endless chain. A¹ A² A³
A⁴ Frame of the machine, a Side line. B endless chain on
which the Horse is to travel. C D. Wheels over which the end
less chain is to pass. E, E, E, E. Wheels or friction rollers which
is to Support the Chain directly under the Horse. F F. Wheels of roll
ers over which the chain is to run and kept from falling so
low as it otherwise would. H. a wheel where the power is taken
from C, and over which a band is placed to carry other machin
ery. What I claim as my own invention and not previously
known in the above described machine is as follows.

First. The peculiar construction of the endless chain, the
bolts which fasten the Slats or cross pieces to the chain having
heads which in turn are to answer as cogs. Second. The wheel
C. over which the chain is to pass is to have holes in its periphery
at such distances and sizes as will be proper to receive the cogs
formed in the chain when put in motion. Third. To have two sets
of rollers, over which the Chain is to pass, as is shown by the
above drawing [illegible] Represents the Slats in which the Horse travels 3[illegible]. 9872 X July 2, 1836 and 3 The rollers which support the chains which will make less friction than the usual mode of having one set of rollers and then extending the whole (nearly) width of the chain. Although I now use leather as the band to my chain I purpose to use iron if found by experience to be best. I therefore claim the principle or manner herein set forth whether the same be made precisely in form described or in any other which is substantially the same producing a similar effect by analogous means.

Witnesses
[illegible] West
Elias Adams

Charles G. Gilbert

Drawing (517 words)